UNITED STATES PATENT OFFICE.

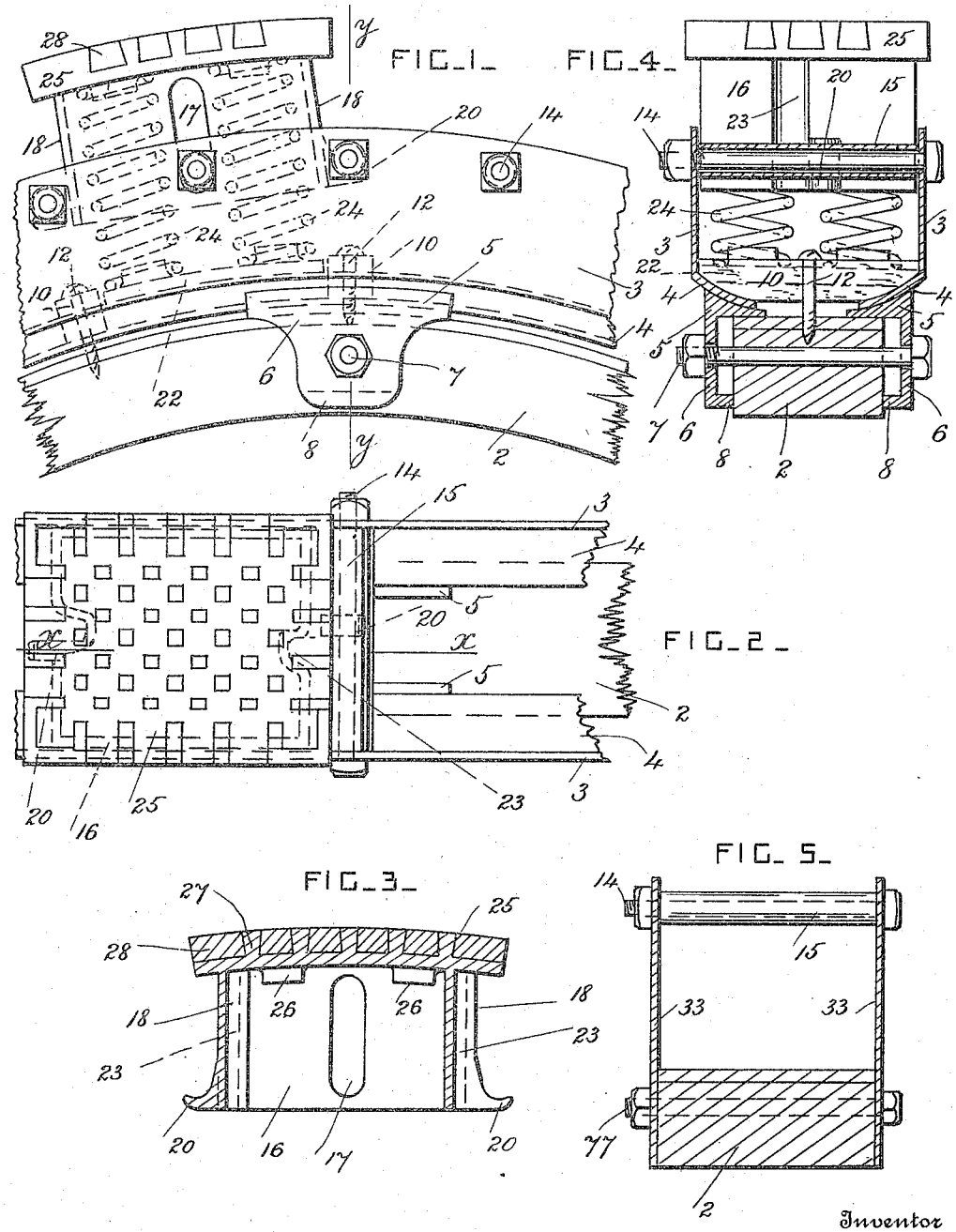

NEWTON SHAVER, OF CLEVELAND, OHIO.

TRACTION-WHEEL.

1,145,518.  Specification of Letters Patent.  Patented July 6, 1915.

Application filed September 12, 1914. Serial No. 861,378.

*To all whom it may concern:*

Be it known that I, NEWTON SHAVER, a citizen of the United States, residing at Cleveland, in the county of Cuyahoga and State of Ohio, have invented certain new and useful Improvements in Traction-Wheels; and I do hereby declare the following to be a full, clear, and exact description of the invention, such as will enable others skilled in the art to which it appertains to make and use the same.

This invention relates to traction wheels for use on all kinds of motor vehicles; and it consists in the novel construction and combination of the parts hereinafter fully described and claimed.

In the drawings, Figure 1 is a side view of a portion of a traction wheel constructed according to this invention. Fig. 2 is a plan view of the same. Fig. 3 is a longitudinal section, taken on the line $x$—$x$ in Fig. 2. Fig. 4 is a cross-section, taken on the line $y$—$y$ in Fig. 1. Fig. 5 is a cross-section through a wheel rim showing a modification of the rim plates.

The wheel rim or felly 2 is of any approved construction, and the spokes and hub are not shown as they are of any approved construction.

Rim plates 3 are provided and are secured to the wheel rim by any approved means. In the modification shown in Fig. 5, in which the rim is a broad one, the rim plates 33 are flat annular plates, and they are bolted directly to the rim by bolts 77, and are arranged parallel to each other. The rim plates 3 are arranged parallel to each other, and are provided with inwardly projecting flanges 4 at their bases. The flanges 4 are arranged at an obtuse angle to the rim plates, and they rest upon wedge-shaped seatings 5. The seatings 5 project laterally from clips 6, which are secured to the rim by bolts 7. The clips 6 are arranged in pairs, and they have projections 8 on their opposite ends from the seatings 5. The clips are arranged at suitable intervals around the wheel rim, and the projections bear on the sides of the rim, so that when the bolts 7 are tightened the wedge-shaped seatings 5 are forced between the flanges 4 and the rim and lock the rim plates securely in place. This construction enables the rim plates to be secured to existing wheels which have narrow rims, and it enables the rim plates and the parts supported by them to be removed and replaced as often as desirable. Crossbars 10 are also provided and are arranged at intervals above the flanges 4, and are secured to the rim by radial screws 12. These crossbars also secure the rim plates to the rim, and clamp the flanges 4 against the seatings. Pins or bolts 14 are arranged in a circumferential series, and are secured between the rim plates 3 near their peripheries, and rollers 15 are journaled on these pins. Spring boxes 16 are provided, and have radial guide slots 17 in the middle portions of their sides. These slots 17 are slipped loosely over one of the rollers 15 so that the ends 18 of the spring boxes may engage very loosely with the two rollers adjacent to them. Each end 18 has a hook-shaped lug 20 which projects circumferentially under one of the rollers and engages pivotally with it. The lugs 20 are arranged out of line.

Base plates 22 for the springs are seated on the flanges 4 under the spring boxes 16. These base plates do not require any bolts to hold them in place, but they may be bolted in place if desired. The springs 24 are arranged in the spring boxes between the base plates 22 and the tread plates 25 which form the tops of the boxes. Clearance grooves 23 are provided for the lugs 20.

The grooves or recesses 23 of each spring box are arranged out of line, and the lugs on the ends of each box are arranged in line with the grooves or recesses in the other ends of the same box. The hook-shaped lugs 20 at the adjacent ends of each two spring boxes come side by side, so that the lug 20 on each spring box slides in the groove or recess 23 of the adjacent spring box. Each spring box can slide radially, and can tilt pivotally on its pivots 15, independently of all the other spring boxes.

Four helical springs are preferably arranged in each spring box, and the tread plates and base plates have projections 26 for positioning the end coils of the springs. In carrying out this invention the number of springs in each spring box may however be varied to suit the size of the wheel and the requirements of the traffic.

The spring boxes are all alike, and they are arranged in a series around the peripery of the wheel, and the tread plates project above the rim plates, and overlap the rollers between the spring boxes.

The treads of the tread plates are corrugated or checkered so that they may afford a good contact surface with the road bed, and in order to prevent the wheel from slipping on ice or any other smooth surface, the spaces between the corrugations or projections 27 on the tread plates are filled in with friction material 28. This friction material 28 may be an india rubber composition, or any other similar material or compound which will slip less readily than metal on a smooth surface.

The spring boxes are forced outwardly by the springs, and each one is slidable independently of the others. The springs normally hold the hook-shaped projections or lugs 20 against the rollers at the ends of the spring boxes, so that the spring boxes can move radially toward the center of the wheel. Each spring box can however tilt independently of the others, and can pivot on either of its lugs 20. The projections 27 on the tread plates can be arranged in any pattern found to give satisfactory results, and are not restricted to the pattern or arrangement shown.

What I claim is:

1. In a spring tire, the combination, with rim plates, and pivots extending crosswise between the rim plates; of spring boxes slidable radially between the said plates and pivots and having hook-shaped lugs and clearance recesses at their ends, the said lugs projecting under the said pivots, the lugs on the ends of each spring box being arranged in line with the clearance recesses in the other ends of the same spring box, and each spring box being free to slide radially and to tilt on its pivots independently of the other spring boxes; and supporting springs arranged in the spring boxes.

2. In a spring tire, the combination, with rim plates having flanges at their bases, base plates resting on the said flanges, and pivots extending crosswise between the rim plates; of spring boxes slidable radially between the said plates and pivots and having hook-shaped lugs and clearance recesses at their ends, the said lugs projecting under the said pivots, the lugs on the ends of each spring box being arranged in line with the clearance recesses in the other ends of the same spring box, and each spring box being free to slide radially and to tilt on its pivots independently of the other spring boxes; and supporting springs arranged in the spring boxes and bearing against the said base plates.

In testimony whereof I have affixed my signature in the presence of two witnesses.

NEWTON SHAVER.

Witnesses:
L. Coy,
Clara Stender.

Copies of this patent may be obtained for five cents each, by addressing the "Commissioner of Patents, Washington, D. C."